United States Patent [19]
Fleuren

[11] Patent Number: 5,570,217
[45] Date of Patent: Oct. 29, 1996

[54] POSITIONALLY INDEPENDENT APPLICATION OF AN OTDR TECHNIQUE BASED ON CORRELATION IN A BRANCHED OPTICAL FIBRE NETWORK DURING OPERATION

[75] Inventor: Franciscus H. Fleuren, HP Gouda, Netherlands

[73] Assignee: Koninklijke PTT Nederland N.V., Netherlands

[21] Appl. No.: 331,221

[22] Filed: Oct. 28, 1994

[30] Foreign Application Priority Data

Nov. 4, 1993 [NL] Netherlands ................ 9301903

[51] Int. Cl.$^6$ ........................................ H04B 10/08
[52] U.S. Cl. ................. 359/110; 359/173; 356/73.1
[58] Field of Search ........................ 359/110, 173, 359/154; 356/73.1; 250/227.15, 227.14; 385/15

[56] References Cited

U.S. PATENT DOCUMENTS

| | | | |
|---|---|---|---|
| 4,911,515 | 3/1990 | So et al. ........................ | 350/96.16 |
| 4,983,007 | 1/1991 | James et al. .................... | 385/15 |
| 5,062,704 | 11/1991 | Bateman ........................ | 250/227.15 |
| 5,093,568 | 3/1992 | Maycock ........................ | 250/227.14 |
| 5,177,354 | 1/1993 | Tomita et al. .................. | 356/73.1 |

FOREIGN PATENT DOCUMENTS

| | | | |
|---|---|---|---|
| 0379609 | 8/1990 | European Pat. Off. ....... | G01M 11/00 |
| 5157638 | 6/1993 | Japan ........................... | G01K 11/12 |
| 9211710 | 7/1992 | WIPO ........................... | H04B 10/08 |

OTHER PUBLICATIONS

D. R. Anderson et al., "Synthetic Fiber Generator", *Research Disclosure*, No. 321, Jan. 1991, Emsworth, GB.
"Clip–On Coupler", *Fiberoptic Product News*, Apr. 1993.
I. Sankawa et al., "Fault Location Technique for In–Service Branched Optical Fiber Networks", *IEEE Photonics Technology Letters*, vol. 2, No. 10, Oct. 1990, pp. 766–768.

*Primary Examiner*—Wellington Chin
*Assistant Examiner*—Rafael Bacares
*Attorney, Agent, or Firm*—Peter L. Michaelson; Michael P. Straub; Michaelson & Wallace

[57] ABSTRACT

In a branched optical fibre network in which an optical signal (I) modulated with a data signal is distributed by a transmitter connected to the network, OTDR based on correlation is applied independently of position by uncoupling both a signal part ($I_1$) of the distributed signal (I) in the forward direction and a signal part ($R_1$) of the reflected signal (R) in the return direction at an arbitrarily chosen uncoupling point P in a fibre connection (46) of the network, detecting them and correlating them with one another. A device for performing such a positionally independent correlation OTDR is provided with uncoupling means (60) having a first signal output (68) and a second signal output (66), via which outputs the signal part ($I_1$) and the signal part ($R_1$), respectively, are fed to optical receivers (70 and 71). The signal parts received are detected by the receivers, demodulated and corresponding electrical signals are supplied to a correlator (78) which produces an OTDR signal for an OTDR imaging means (82).

10 Claims, 3 Drawing Sheets

POSITIONALLY INDEPENDENT APPLICATION OF AN OTDR TECHNIQUE BASED ON CORRELATION IN A BRANCHED OPTICAL FIBRE NETWORK DURING OPERATION

A. BACKGROUND OF THE INVENTION

1. Field of the Invention

The invention is in the field of monitoring optical fibre networks. More particularly, it is in the field of monitoring the physical state of optical fibre connections by means of fault location techniques with the aid of optical time-domain reflectometry (OTDR) based on correlation. The invention relates to an application of such a fault location technique in a branched network of an optical fibre connection during operation.

2. Prior Art

To monitor the physical state not only of a single optical fibre connection but also of branched optical fibre networks, it is generally known to apply OTDR techniques for locating faults such as optical fibre rupture. In this technique, a short optical pulse is launched at an input end of the optical fibre connection or the optical fibre network and the reflected optical signal is then detected at the same input end during a certain period of time. Since near reflections are back earlier at the input end than those further away, the reflected power in the optical fibre connection or the optical fibre network can be measured as a function of the distance from the input end. Not only do strong reflections occur as a consequence of the presence of connectors or mechanical splices, but weak reflections are also present as a consequence of Rayleigh backscattering. Optical fibre rupture and its location can easily be detected since a signal is no longer reflected from distances beyond a rupture. Reference [1] discloses a method and a device for using OTDR in which, instead of a short optical pulse, series of optical pulses are injected into the optical transmission medium, such as an optical fibre and in which the reflected signal is then correlated with the injected signal. From the correlation, a signal is obtained which represents the amplitude of the reflected signal as a function of the time which has elapsed since the pulse series were injected or as a function of the distance traversed from the point at which the pulse series were injected. The disadvantage of such an OTDR technique is that the launching of an additional signal is required. Since it is preferably precisely during operation that monitoring of the connection or of the network takes place, special procedures are necessary in order not to disturb the signal traffic passing via the connection or the network. As a solution to this problem, it is known, for example from reference [2], to use a wavelength of the pulse signal for fault location which is markedly different from the communication wavelength. A solution in which no additional signal is launched is known from reference [3]. In an optical communication system, a number of bidirectional optical fibre lines connect an exchange to an equal number of subscribers. Both in the exchange and in the case of each subscriber, an optical transmitter and an optical receiver are connected to the end of the optical fibre line concerned. As a consequence of an additional reflection means, each optical receiver at the subscriber end continuously reflects a part (preferably 15%) of the received optical signal into the optical fibre line back to the exchange. In the exchange, the reflected signal of each subscriber is detected during a short time consecutively from each optical fibre line. If the detected reflection signal of an optical fibre line is above a preset threshold value which is matched to the reception of the signal additionally reflected in each receiver, switching takes place to the next optical fibre line. If the detected reflection signal is below the threshold value, then, in addition to an alarm signal, a signal is also emitted which switches on a correlator device in which the detected reflection signal is correlated with a delayed electrical signal corresponding to the optical signal transmitted to the subscriber concerned. As a result of the correlation, a signal is obtained for optical time-domain reflectometry of the optical fibre connection to the subscriber concerned. This known method of performing OTDR based on correlation is hereinafter referred to as correlation OTDR. The great advantage of such a monitoring system based on correlation OTDR is that, for the purpose of correlation, use is made of a signal which has in any case to be transmitted by the exchange to the subscriber concerned and it is therefore not necessary to launch any additional signal which may also have a disturbing effect on the communication. Disadvantages of this known technique are, however, that this method of monitoring is tied to an end of an optical fibre connection and that an intervention in the transmitting equipment is also required by the method in which the signal used for the correlation is obtained.

B. SUMMARY OF THE INVENTION

The object of the invention is to provide a method and a device for monitoring, by means of fault location with the aid of optical time-domain reflectometry based on correlation, at least a part of an optical transmission medium comprising at least one optical fibre connection for distributing an optical signal, modulated with a data signal, of a transmitter connected to the optical transmission medium to at least one receiver, which method and device do not have the disadvantages mentioned above.

Such a method, which comprises a main step in which a first signal corresponding to the modulated optical signal transmitted in the direction of the at least one receiver is correlated with a second signal corresponding to a signal reflected in that part of the optical transmission medium which is to be monitored has, according to the invention, the characteristic in that the first signal and the second signal are obtained by uncoupling with the aid of optical uncoupling means at or near a preselected uncoupling point in the optical optical transmission medium.

Such a device for performing the method, which device comprises first signal derivation means for deriving a first signal corresponding to the modulated optical signal transmitted in the direction of the at least one receiver, second signal derivation means for deriving a second signal corresponding to a signal reflected in that part of the optical transmission medium which is to be monitored, and correlation means for correlating the second signal with the first signal has, according to the invention, the characteristic in that the device comprises optical uncoupling means provided with a first optical signal output and a second optical signal output, respectively, for coupling at least a fraction of the optical modulated signal and at least a fraction of the reflected signal out of a fibre connection in the optical transmission medium, and in that the first and the second signal derivation means comprise opto/electrical converters coupled, respectively, to the first and the second signal output of the uncoupling means.

The invention is based on the following insight. In a branched fibre network, any point between the transmitting end and the receiving end, on the one hand, is to be interpreted as a starting point or transmitting point of a subnetwork, branched or not, where a signal which is reflected in said subnetwork and which could be used for correlation OTDR can be detected, provided a suitable signal were available for performing the correlation. On the other hand, the same point is to be interpreted as an end point or receiving point of a subnetwork, branched or not, where the data signal with which the transmitted optical signal is modulated at the transmitting end can be detected from the optical signal propagating in the forward direction (i.e. in the direction of the receiving end) at that point. The invention makes use of the fact that such a detected signal is suitable for performing the correlation OTDR for monitoring the subnetwork of which the chosen point is the starting or transmitting point.

The invention makes it possible to perform the monitoring during operation at any point where the optical fibre of a single connection or of a (sub)network is accessible to optical uncoupling means such as, for example, by means of a 'clip-on' procedure. This has the great advantage that, in a branched optical network, certain parts can be selectively monitored. Even if optical amplifiers are incorporated in the network, the invention can be applied to network parts between consecutive amplifiers. The optical uncoupling means can also be incorporated at any desired point in a fibre connection, optionally in combination with an optical amplifier, in the fibre connection.

C. REFERENCES

[1] EP-A-0379609;
[2] I. Sankawa et al.: "Fault location technique for in-service branched optical fiber networks", IEEE Phot. Techn. Letters, Vol. 2, No. 10, October 1990, pages 766–768;
[3] U.S. Pat. No. 4,911,515 (So et al.);
[4] "Clip-on coupler", Fibreoptic Product News, 4. '93, New Products section, page 15.

D. BRIEF DESCRIPTION OF THE DRAWING

The invention will be explained in greater detail by means of the description of some exemplary embodiments, reference being made to a drawing which comprises the following figures.

E. DESCRIPTION OF AN EXEMPLARY EMBODIMENT

Figure 1:
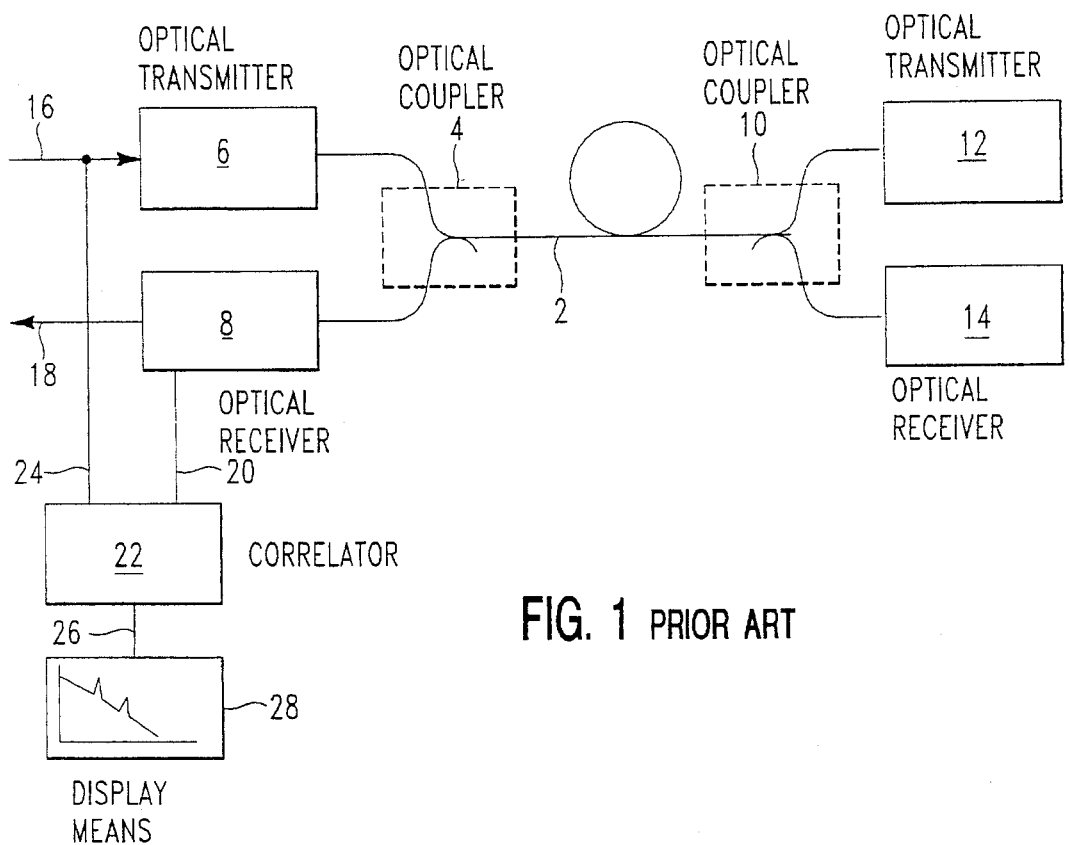
FIG. 1 shows diagrammatically a method of monitoring an optical fibre line by means of correlation OTDR according to a known procedure.

Reference [3] shows the application, in an optical communication system, of 'optical time-domain reflectometry' based on correlation, or correlation OTDR, in which no additional signal is launched. In the application, separate bidirectional optical fibre lines connecting an exchange to a number of subscribers are monitored. Both in the exchange and in the case of each subscriber, an optical transmitter and an optical receiver are connected to the end of the optical fibre line concerned. As a consequence of an additional reflection means, each optical receiver at the subscriber end continuously reflects a part (preferably 15%) of the received optical signal into the optical fibre line back to the exchange. At the exchange end, the equipment with which the correlation OTDR is performed is coupled in succession to each optical fibre line by means of an electronic switch. If the detected reflection signal of an optical fibre line is above a preset threshold value which is matched to the reception of the signal additionally reflected in each receiver, switching takes place to the next optical fibre line. If the detected reflection signal is below the threshold value, then, in addition to an alarm signal, a signal is also emitted which switches on a correlator device in which the detected reflection signal is correlated with a delayed electrical signal corresponding to the optical signal transmitted to the subscriber concerned. As a result of the correlation, a signal is obtained for optical time-domain reflectometry of the optical fibre connection to the subscriber concerned. FIG. 1 shows diagrammatically the situation for one such optical fibre line, in particular, insofar as is relevant to the explanation of the exemplary embodiment. In this figure, the electronic switch for switching to the next optical fibre line and the facility for switching on by means of a reflection signal level which is dependent on the switching-on signal for the correlation device have been omitted. An optical transmitter 6 and an optical receiver 8 are connected via a first optical coupler 4 to an optical fibre line 2 at an end in the exchange, and an optical transmitter 12 and an optical receiver 14 are connected via a second optical coupler 10 to the other end in the case of a subscriber. An electrical data signal is fed to the optical transmitter 6 via an input line 16. The transmitter 6 transmits an optical signal modulated in accordance with the electrical data signal via the optical fibre line 2 in the direction of the receiver 14. As a consequence of Rayleigh backscattering and reflections at optical "irregularities" in the optical fibre line, a part of the transmitted optical signal is continuously reflected back via the optical fibre line in the direction of the exchange. The reflected signal is received in the receiver 8 in the exchange, detected, amplified and converted into an electrical signal. In this process, the received reflected signal is separated from any optical signal which is received at the same time and originates from the transmitter 12 and which is supplied as electrical data signal to an output line 18 of the receiver 8. The electrical signal corresponding to the received reflected signal is fed via a first input line 20 to a correlator 22. Via a second input line 24, the electrical data signal which is to be transmitted and which is fed via the input line 16 to the transmitter 6 is also fed to the correlator 22. The correlator 22 correlates the two electrical signals fed via the input lines 20 and 24 with one another, a signal being delivered on an output line 26 to an OTDR display means 28, such as a viewing screen or a plotter. To perform the correlation, the original electrical data signal fed via the input line 24 must, of course, undergo a suitable delay with respect to the received reflected signal. This delay is not shown explicitly in FIG. 1, but is considered to form part of the correlator 22.

Figure 3:
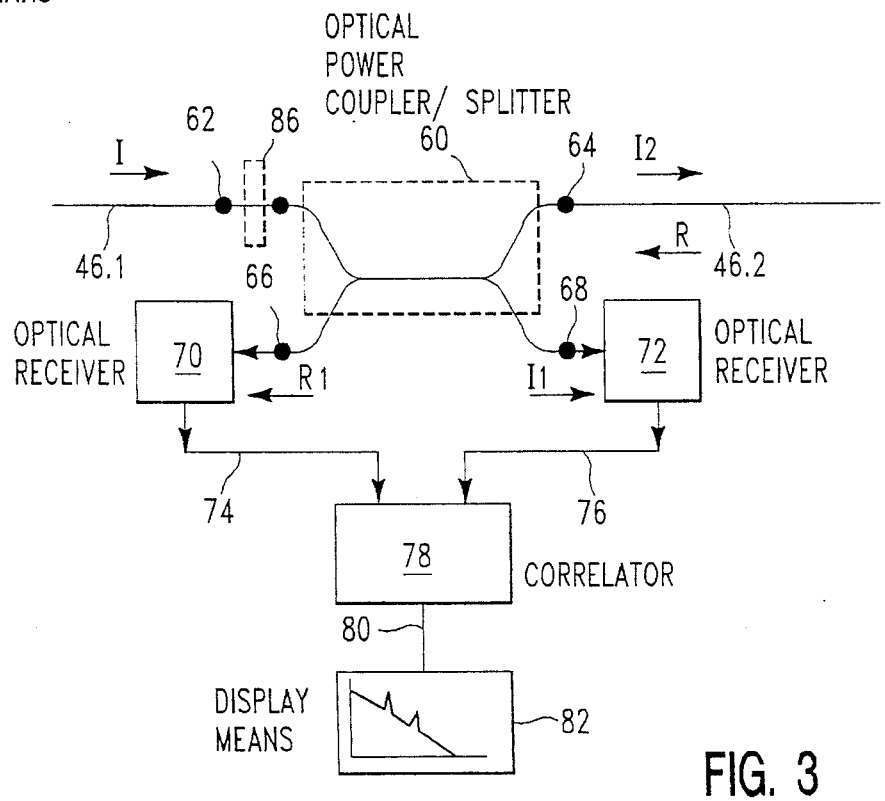
FIG. 3 shows diagrammatically a device according to the invention for monitoring a part of the network at a point P shown in FIG. 2.
Figure 2:
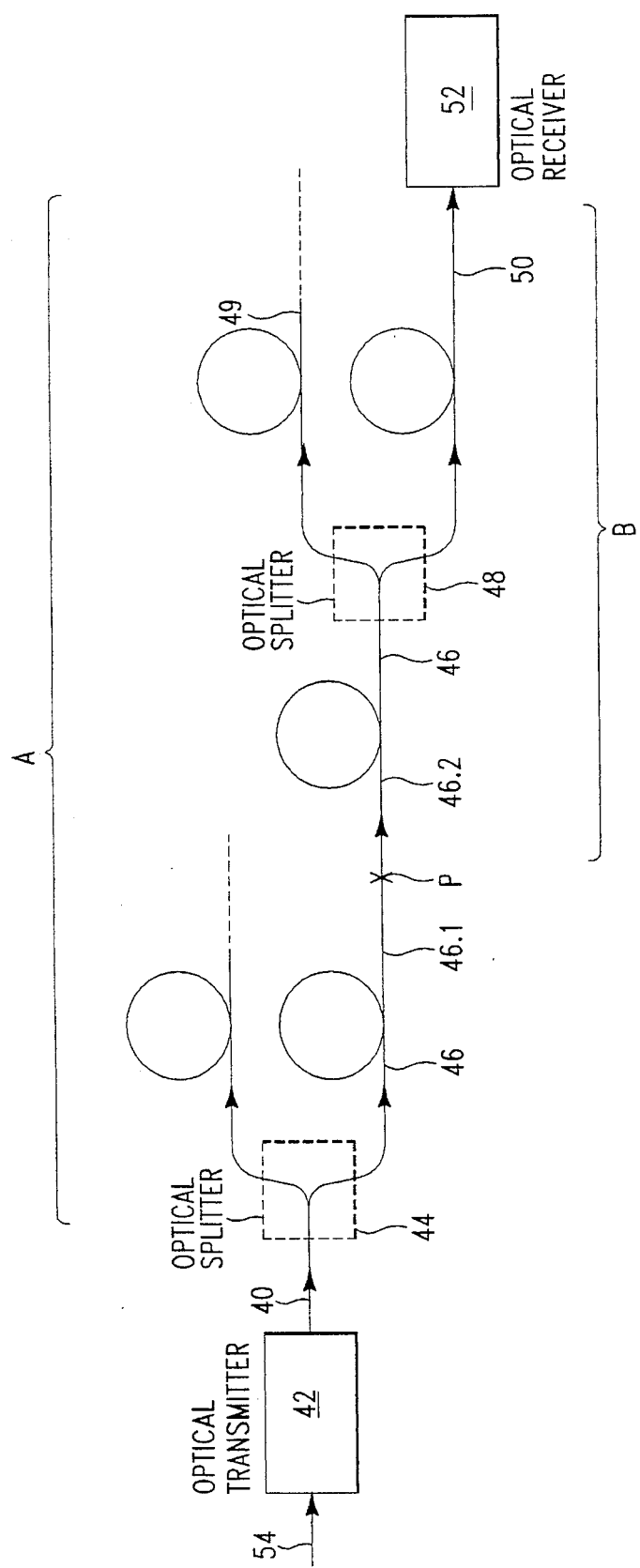
FIG. 2 shows diagrammatically a branched network of optical fibre connections in which, according to the invention, a part of the network is being monitored by means of correlation OTDR at a point P to be selected arbitrarily in the network.

FIG. 2 shows diagrammatically a branched optical fibre network A. Said network comprises an optical fibre connection 40 between a transmitter 42 connected to the network and a splitter, such as splitter 44, optical fibre connections between two splitters, such as optical fibre connection 46 between splitters 44 and 48, and optical fibre connections between a splitter and a receiver, such as optical fibre connection 50 between splitter 48 and receiver 52. Via an input line 54, an electrical data signal is fed to the optical transmitter 42 for transmission as optical signal via the fibre connections of the network A in the direction of the receivers, such as receiver 52, connected to the network. On the one hand, an arbitrary point P in the network A, for example chosen in the fibre connection 46, has, viewed upstream, a direct connection to the transmitter 42 via the splitter 44 and fibre connection 40. On the other hand, the point P is the starting point of a subnetwork B of the network A. The splitters are power splitters for the optical signal transmitted by the transmitter 42. The entire optical signal which passes point P in the fibre connection 46 in the forward signal direction (i.e. from transmitter in the direction of receiver) and which is part of the optical signal transmitted by the transmitter 42 is distributed in the subnetwork B. Of said signal distributed in the subnetwork B, a part is reflected as a consequence of Rayleigh backscattering and reflections at optical "irregularities" in the optical fibre connections of the subnetwork B. This reflected signal passes point P in the reverse signal direction (i.e. from receiver in the direction of transmitter). With the aid of suitable optical coupling means, a part both of the signal in the forward direction and of the signal in the reverse direction is uncoupled at point P and then detected with suitable detection means. The detected signals are used to perform correlation OTDR for the purpose of monitoring the subnetwork B. FIG. 3 shows diagrammatically a device with which the correlation OTDR is performed at point P. In a first design, the device comprises, as uncoupling means, an optical power coupler/ splitter 60 having four ports 62, 64, 66 and 68. Connected to the ports 66 and 68 are optical receivers 70 and 72, specifically in such a way that an optical signal which enters the coupler 60 via port 62 partially propagates further via port 64 and is partially fed to the receiver 72 via port 68, an optical signal which enters the coupler 60 via port 64 is fed, at least in part, via port 66 to optical receiver 70. The receivers 70 and 72 have signal connections 74 and 76, respectively, to a correlator 78. The output of the correlator 78 is connected via a signal connection 80 to an OTDR display means 82. The receivers 70 and 72 convert the received optical signals into electrical signals. The receivers 70 and 72 may be chosen to be identical and, for example, formed by a combination of an opto/electrical converter and an amplifier. As correlator 78 and OTDR display means 82, use may be made of the correlator 22 and OTDR display means 28 disclosed in reference [3] and shown in FIG. 1. Since they do not belong to the essence of the invention, they are not elaborated in greater detail. To monitor the subnetwork B, a device in accordance with the design shown in FIG. 3 is incorporated at a point P of the network as shown in FIG. 2. For this purpose, the fibre connection 46 is opened, for example by cutting open, at the position of point P, preferably during the installation of the network, and the ends 46.1 and 46.2 produced in this process are connected to the ports 62 and 64 of the coupler 60 via spliced connections or with the aid of suitable connectors. Of an optical signal I originating from the transmitter 42 and entering the coupler 60 via the port 62, a signal part $I_1$ is fed to receiver 72 via port 68. The receiver 72 detects and amplifies the received signal and supplies a corresponding electrical signal to the correlator 78 via the signal connection 76. Another signal $I_2$ leaves the coupler 60 via the port 64 and propagates further in subnetwork B. Of the signal $I_2$, a part which enters the coupler 60 as a reflection signal R via port 64 is reflected in the subnetwork B. A signal fraction $R_1$ of said reflection signal R is fed to the receiver 70 via port 66. The receiver 70 detects and amplifies the received signal and supplies a corresponding electrical signal to the correlator 78 via signal connection 74. The correlator 78 is such that, for the purpose of the correlation, the electrical signal received via the connecting line 76 is delayed for a suitable period of time. Just as in the diagram of FIG. 1 showing the known correlation OTDR procedure, this delay is also not shown explicitly in the diagram of FIG. 3.

The electrical signals with which the correlation is performed may be either analog or digital signals.

Figure 4:
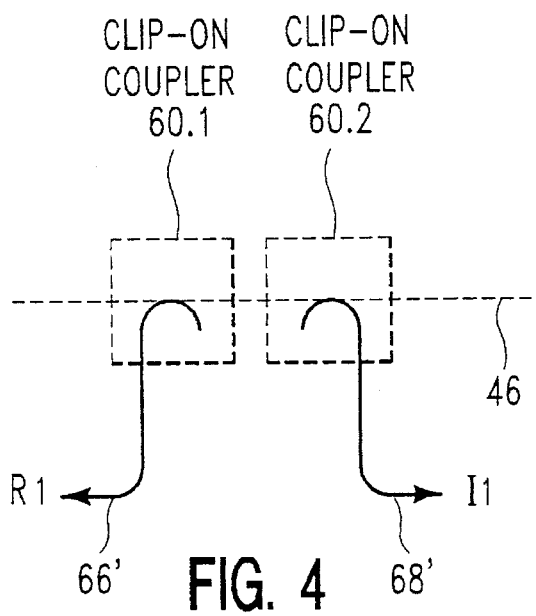
FIG. 4 shows diagrammatically a variant of the uncoupling means in the device shown in FIG. 3.

The coupler/splitter is preferably such that the power of the signal fraction $I_1$ is approximately 10% of the power of the signal I, so that the power of the signal fraction $R_1$ is also approximately 10% of the power of the reflection signal R. Such a coupler/splitter introduces an attenuation of approximately 1 dB, which is usually still acceptable, into the network. A device as shown in FIG. 3 furthermore has the advantage that an optical amplifier 86 can be incorporated at the port 62, so that subnetworks in which, without amplification, the attenuation is too high to still be able to make reliable measurements can be monitored with the same device. Under some circumstances, it may even be a disadvantage for the coupler/splitter to be incorporated in the network, since additional splice or connector attenuations and reflections are thereby introduced into the network. In such cases, the device may also be constructed with uncoupling means instead of with a coupler/splitter, which uncoupling means can be coupled to a fibre connection at a point P in the network A for the duration of the measurement. As such uncoupling means, "clip-on" couplers which are known per se and obtainable commercially may be used. See, for example, reference [4]. FIG. 4 shows diagrammatically such a "clip-on" variant employing two "clip-on" couplers numbered 60.1 and 60.2. The couplers 60.1 and 60.2 have, respectively, outputs 66' and 68', which correspond to the ports 66 and 68 of the coupler/splitter shown in the device in FIG. 3. The clip-on couplers are coupled to a fibre connection, such as fibre connection 46 (shown by a broken dash line in FIG. 4), preferably in the vicinity of one another or in the vicinity of point P of network A shown in FIG. 2. Under these circumstances, the coupler 60.2 is coupled to the fibre connection 46 in the forward signal direction to uncouple the signal fraction $I_1$, the coupler 60.1 being coupled to the fibre connection 46 in the reverse signal direction to uncouple the signal fraction $R_1$.

Figure 5:
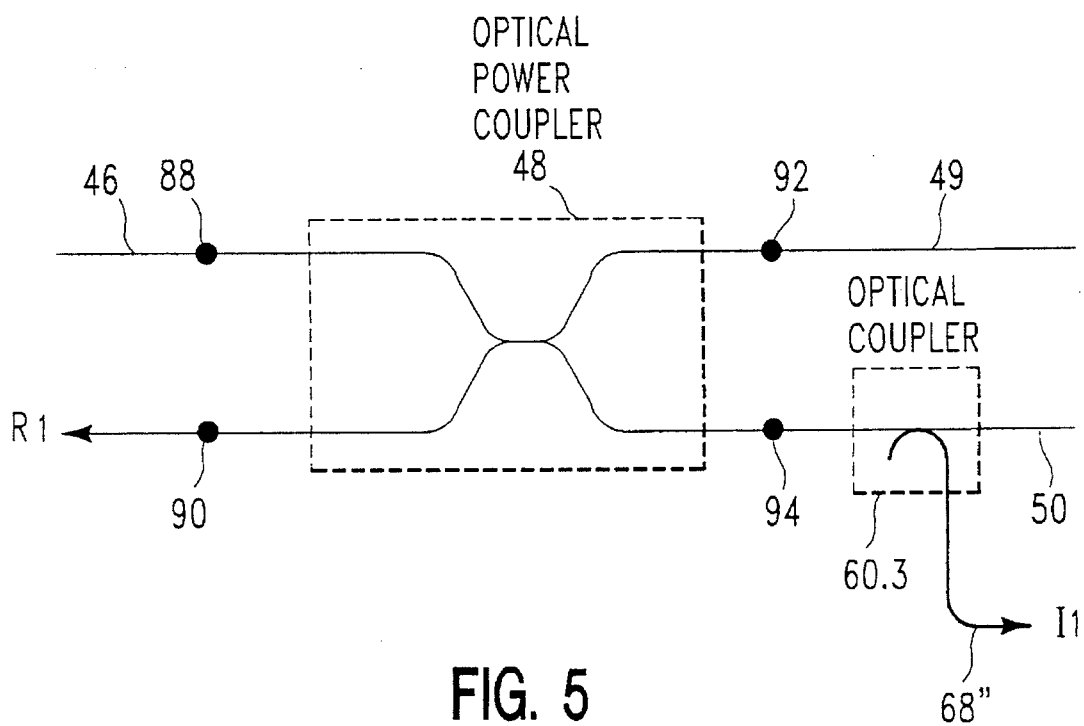
FIG. 5 shows diagrammatically a further variant of the uncoupling means in the device shown in FIG. 3.

A further variant makes use of the fact that the splitters used in branched optical fibre networks are usually power splitters formed by a 2×2 power coupler having two input and two output ports or comprising an assembly of a number of such 2×2 power couplers, one of the input ports not being used for the actual signal transfer in the network. Correlation OTDR can also be performed at such a power splitter. This is shown diagrammatically in FIG. 5. By way of example, splitter 48 is constructed as 2×2 power coupler having input ports 88 and 90 and output ports 92 and 94. Fibre connection 46 is connected to input port 88 and fibre connections 49 and 50 to the output ports 92 and 94, respectively. A signal fraction $R_1$ of the reflection signal R is taken off at the input port 90, a signal fraction $I_1$ of the optical signal I being taken off at the fibre connection 50 connected to output port 94 with the aid of a "clip-on" coupler 60.3. The coupler 60.3 has an output 68" corresponding to port 68 of the coupler/splitter in the device shown in FIG. 3, input port 90 corresponding to port 66 of said coupler/splitter. Instead of being coupled to fibre connection 50, the "clip-on" coupler 60.3 may also be coupled to fibre connection 49 in the vicinity of output port 92 or to fibre connection 46 in the vicinity of input port 88.

What is claimed is:

1. A method of monitoring, by means of fault location with the aid of optical time-domain reflectometry based on correlation, at least a part of an optical fiber transmission network comprising at least one optical fibre connection for distributing an optical signal, modulated with a data signal, from a transmitter connected to the optical transmission network to at least one receiver, the method comprising the steps of:

a first uncoupling step of uncoupling a first optical signal from the network at an uncoupling point in a fiber connection of the network ahead of said part of the network, said first optical signal being a fraction of the distributed optical signal;

a second uncoupling step of uncoupling a second optical signal from the network at or near the uncoupling point, said second optical signal being at least a fraction of signals reflected in said part of the network being monitored;

a converting step converting separately said first and second optical signals to first and second electrical signals, respectively, and a correlating step of correlating said second electrical signal with said first electrical signal.

2. The method according to claim 1, wherein at least one of the first and second uncoupling steps is performed using uncoupling means which can be coupled to said optical fiber connection at the position of said uncoupling point.

3. The method according to claim 1, wherein the first and second uncoupling steps are performed with uncoupling means incorporated in the optical fibre connection at the position of said uncoupling point.

4. The method according to claim 3, further comprising the step of amplifying the distributed optical signal prior to the uncoupling of the first optical signal.

5. A device for monitoring, by means of fault location with the aid of optical time-domain reflectometry based on correlation, at least a part of an optical transmission network comprising at least one optical fibre connection for distributing an optical signal, modulated with a data signal, from a transmitter connected to the optical transmission network to at least one receiver, the device comprising:

a first uncoupling means for uncoupling a first optical signal from the network at an uncoupling point in a fiber connection of the network ahead of said part of the network, said first optical signal being a fraction of the distributed optical signal;

a second uncoupling means for uncoupling the second optical signal from the network at or near the uncoupling point, said second optical signal being at least a fraction of signals reflected in said part of the network being monitored;

first and second photo/electrical conversion means for separately converting said first and second optical signals to first and second electrical signals, respectively; and correlation means for correlating the second electrical signal with the first electrical signal and for supplying a signal for optical time-domain reflectometry in that part of the optical transmission network which is to be monitored.

6. The device according to claim 5, wherein at least one of the first and second uncoupling means can be coupled.

7. The device according to claim 6, wherein said at least one of the first and second uncoupling means is a coupler of the 'clip-on' type.

8. The device according to claim 7, wherein each of the first and second uncoupling means is a coupler of the 'clip-on' type.

9. A device for monitoring by means of fault location with the aid of optical time-domain reflectometry based on correlation, at least a part of an optical transmission medium comprising at least one optical fibre connection for distributing an optical signal, modulated with a data signal, of a transmitter connected to the optical transmission medium to at least one receiver, the device comprising:

optical uncoupling means provided with a first optical signal output and a second optical signal output, respectively, for coupling at least a fraction of the optical modulated signal and at least a fraction of the reflected signal out of a fibre connection in the optical transmission medium;

first signal derivation means for deriving a first signal corresponding to the modulated optical signal transmitted in the direction of the at least one receiver;

second signal derivation means for deriving a second signal corresponding to a signal reflected in that part of the optical transmission medium which is to be monitored, the first and the second signal derivation means including opto/electrical converters coupled, respectively, to the first and the second signal output of the uncoupling means;

correlation means for correlating the second signal with the first signal and for supplying a signal for optical time-domain reflectometry in that part of the optical transmission medium which is to be monitored;

wherein the uncoupling means comprise a combined coupler/splitter provided with two input ports and two output ports, of which a first input port forms the first optical signal output and a first output port forms the second optical signal output, and the second input port and the second output port can be connected to fibre ends of a fibre connection which is opened at the selected uncoupling point.

10. The device according to claim 9, wherein the second input port includes an optical amplifier.

* * * * *